July 2, 1968   W. J. DAVIES ET AL   3,390,928
BEARING

Filed June 29, 1966   3 Sheets-Sheet 1

July 2, 1968  W. J. DAVIES ET AL  3,390,928
BEARING
Filed June 29, 1966  3 Sheets-Sheet 2
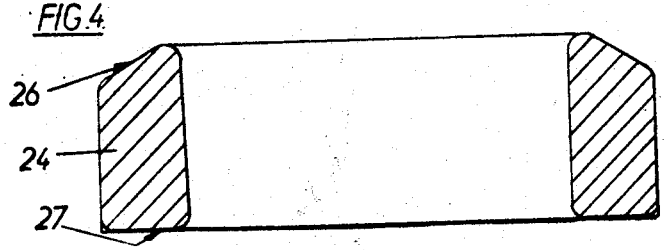
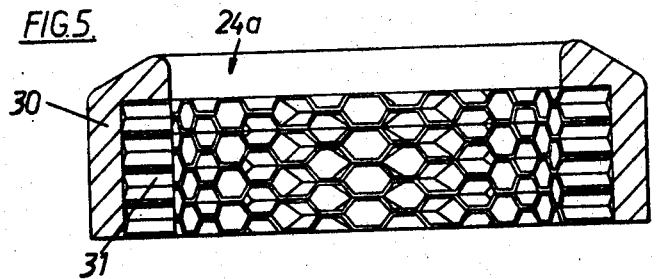
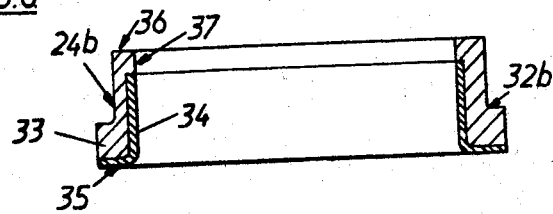
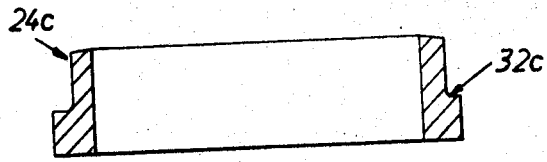

United States Patent Office 3,390,928
Patented July 2, 1968

3,390,928
BEARING
William John Davies, Spondon, Derby, and Colin Frederick Smith, Mickleover, Derby, England, assignors to Rolls-Royce Limited, Derby, Derbyshire, England, a British company
Filed June 29, 1966, Ser. No. 561,478
Claims priority, application Great Britain, July 19, 1965, 30,702/65
12 Claims. (Cl. 308—187)

ABSTRACT OF THE DISCLOSURE

The disclosure of this invention pertains to a bearing having an integrally formed cage provided with pockets for the rolling elements and an insert member having lubricating properties surrounding the rolling elements. Each pocket has a radially inwardly facing surface and each insert has a radially outwardly facing surface abutting the inwardly facing surface of the pocket.

---

Figure 1:
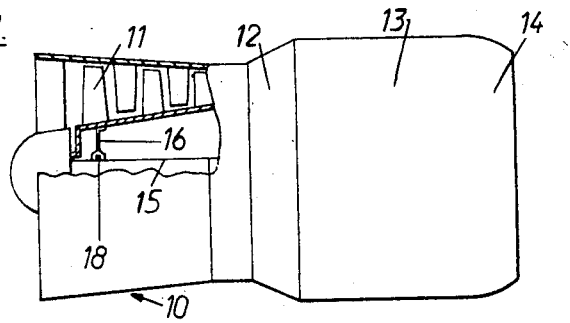

This invention concerns a bearing and, although not so restricted, will hereinafter be described with reference to its use in a gas turbine engine, e.g., a light-weight vertical lift engine.

According to the present invention, there is provided a bearing comprising radially spaced races, rolling elements disposed between and in rolling contact with said races, an integrally formed cage having pockets within which the rolling elements are disposed and in each pocket an insert comprising a member having lubricating properties which surrounds the respective rolling element, each pocket having a radially inwardly facing surface, each respective insert having a radially outwardly facing surface which abuts the said inwardly facing surface.

In a preferred embodiment, the rolling elements are balls and the inserts are annular.

Thus, the radially outer edge of each insert may be chamfered to form the said surface and may abut a chamfered flange on the cage. Alternatively, the radially outwardly facing surface of each insert may abut a corresponding radially inwardly facing flange in each pocket.

The inserts may extend radially inwardly of said cage, the radially inner face of each insert being curved to conform to the shape of the radially outer face of said inner race.

The bearing may be provided with an oil reservoir, conduit means being provided for conveying oil from the reservoir to the insert to replenish the latter.

The conduit means may supply the oil to the outer peripheral surface of the insert.

The bearing may comprise a pair of annular members which respectively receive opposite ends of the cage, one of the members having a cavity which constitutes the reservoir, the cage having conduits therein to feed oil from the reservoir to the respective inserts.

The annular members may be provided with axially extending flanges which abut the radially inner ends of the inserts to retain them in their respective pockets.

The inserts may be fixed within their respective pockets by any suitable means including, for example, bonding, welding, brazing or a mechanical connection such as screw threading or they may form an interference fit with their pockets.

The solid lubricant is preferably mineral. Thus, the inserts may be formed of a metal, a metal salt, an alloy, a ceramic, or a synthetic resin material. Thus, the inserts may be formed of Stellite, or they may be formed of or include polytetrafluoroethylene.

In an alternative embodiment, each insert may comprise a metal sleeve which is at least partially lined with the member having lubricating properties. Thus, the lubricant may be alumina, or molybdenum, and may be flame plated, plasma sprayed or electro-deposited on the sleeve.

In a further embodiment, the sleeve may be lined with a honeycomb liner, the cells of which contain members having lubricating properties.

In any of the embodiments described above, the member having lubricating properties may comprise a porous member impregnated with a liquid lubricant.

The invention also includes a gas turbine engine having its main shaft supported in a bearing as set forth above.

It will be appreciated that a bearing including a solid lubricant as set forth above is of particular use in, for example, a light-weight direct lift engine since the supply ducting, pumps, return circuits, lubricant reservoir and seals, for a liquid lubricant can be dispensed with, or at least reduced, thereby saving considerable weight and improving the thrust to weight ratio of the engine.

Figure 2:
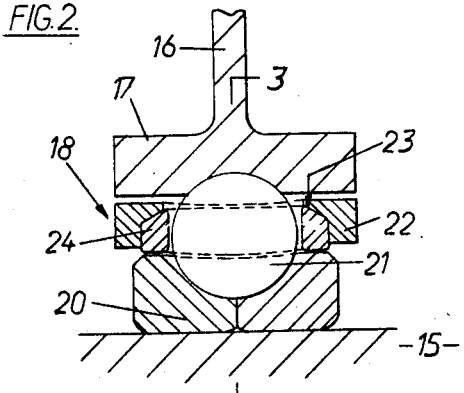
Figure 3:
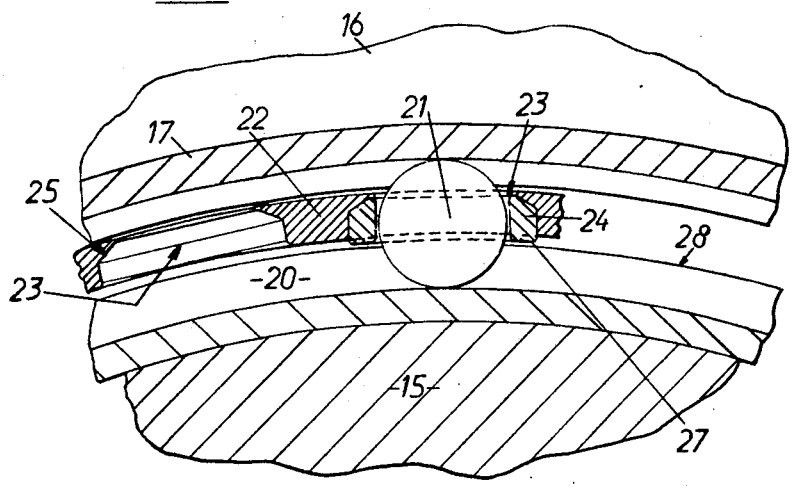
Figure 8:
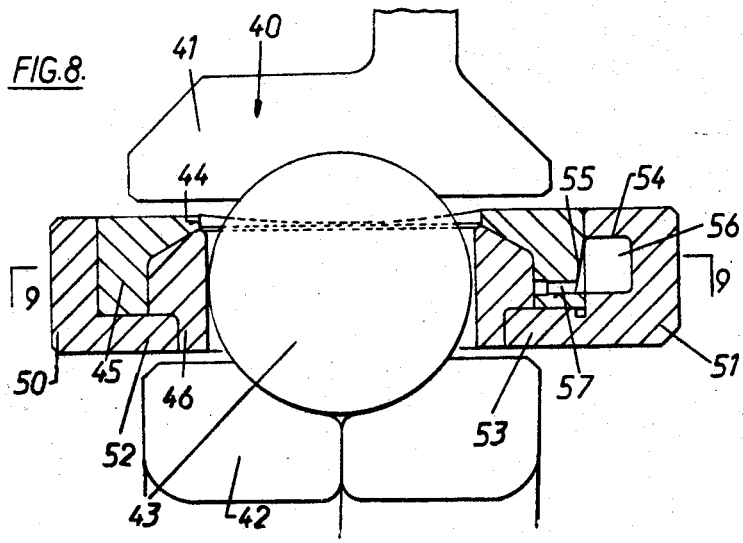
Figure 9:
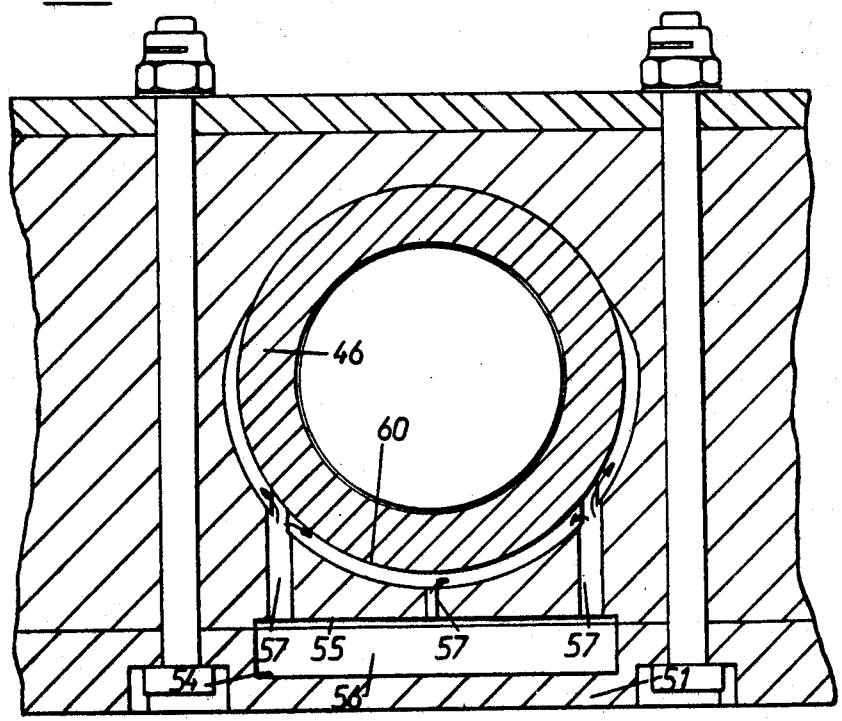

The invention is illustrated, merely by way of example, in the accompanying drawings, in which:

FIGURE 1 is a part cut-away sectional view of a gas turbine vertical lift engine including a bearing according to the present invention, FIGURE 2 is a part-sectional elevation of part of the engine shown in FIGURE 1, FIGURE 3 is a part-sectional end elevation of a component shown in FIGURE 2 taken on the line 3—3 of that figure, FIGURE 4 is a part-sectional elevation of an insert shown in FIGURE 3, FIGURE 5 is a part-sectional elevation of an alternative form of insert which may be used with the bearing of FIGURE 3, FIGURES 6 and 7 are sectional views of two further forms of insert which may be used with bearings according to the present invention, FIGURE 8 is a broken away sectional view of another embodiment of a bearing according to the present invention, and FIGURE 9 is a broken away sectional view taken on the line 9—9 of FIGURE 8.

In FIGURE 1 there is shown a gas turbine engine 10 comprising a compressor 11, combustion equipment 12, turbine 13 and jet pipe 14 all arranged in axial flow series. The engine is provided with a main shaft 15 about which the compressor 11 is rotatably mounted.

The compressor 11 includes a radial disc 16 which, as shown in FIGURES 2 and 3, terminates in an axially extending flange 17 which constitutes the radially outer race of a ball bearing 18.

The ball bearing 18 includes a split inner race 20, which is secured to the shaft 15, and a plurality of balls 21 disposed between and in rolling contact with the outer and inner races 17, 20. The balls 21 are spaced apart by a cage 22 having pockets 23 within which the balls are disposed. Disposed in each of the pockets 23 is an annular insert 24 of solid lubricant.

As seen more clearly in FIGURE 3, each of the pockets 23 is provided at its radially outer end with chamfered flange 25. The radially outer end of each of the inserts 24 is also chamfered as indicated at 26 (see FIGURE 4) and this chamfered edge seats on the chamfered flange of each pocket to limit radially outward movement of the inserts 24 under centrifugal force when the bearing is in operation.

In the embodiment illustrated in FIGURES 1 to 4, the cage 22 may be of steel and the inserts 24 may be formed of Stellite. The Stellite inserts are bonded into the steel cage with a bonding material such as that sold under the trademark "Araldite," although any suitable method of fixing can be employed such, for example, as welding, screw threading or forming the inserts 24 as an interference fit within the pockets 23.

As clearly seen in FIGURES 2 and 3, each insert 24 projects radially inwardly of the cage 22 such that its radially inner face 27 is disposed adjacent the radially outer face 28 of the inner race 20. The cage 22 is located by the inner race 20, the inner face 27 of each insert 24 being formed such that it is curved in a manner similar to the curvature of the outer face 28 of inner race 20. The cage 22 may alternatively be located by rings of suitable materials fitted to the inner face of the outer race.

It will be appreciated that the insert 24 need not be formed of Stellite but could, for example, be formed of polytetrafluoroethylene material such, for example, as that sold under the trade name "Fluorosint" by Polypenco Ltd. Again, the insert 24 might also be formed of, for example, porous bronze, and polytetrafluoroethylene material such as that sold under the trademark "Rulon," or a composition of copper, tungsten diselenide and polytetrafluoroethylene, such as that sold under the trademark "Composite" by Westinghouse.

An alternative form of inserts is shown in FIGURE 5 at 24a. In the embodiment of FIGURE 5, the insert comprises a steel sleeve 30, a cylindrical inner face of which is lined with a honeycomb liner 31. Each of the cells in the honeycomb liner is filled with a solid lubricant such as one of those materials indicated above, i.e., "Fluorosint," "Rulon" or porous bronze. Apart from the honeycomb insert with its solid lubricant, the external shape of the insert 24a is identical to that of the inserts 24 and fits in the cage 22 in a manner similar to the inserts 24 as described above.

Two further forms of insert which may replace the inserts 24 are shown in FIGURES 6 and 7 and are indicated at 24b and 24c respectively. These inserts are characterised by the provision of radially outwardly facing lands 32b, 32c which are adapted to co-operate with corresponding radially inwardly directed lands provided in the pockets 23 of the cage 22. Thus, the pockets 23 would not be of the chamfered form shown in FIGURE 3 but would be provided with lands suitable to receive the lands 32b, 32c of the embodiments of FIGURES 6 and 7. It will be appreciated that the co-operating lands will prevent radial movement of the inserts under centrifugal force.

The insert 24b shown in FIGURE 6 comprises a steel sleeve 33 which is lined internally with a solid lubricant liner 34. The liner 34 extends over the radially inner face 35 of the insert but terminates before the radially outer face 36 of the insert, the sleeve 33 having a lip 37 which prevents radially outward movement of the liner 34 under centrifugal force.

The liner 34 is formed of any suitable material, such for example, as alumina, which may be flame plated onto the sleeve 33, or of molybdenum which may be plasma sprayed onto the steel sleeve 33. The alumina employed may, for example, be that sold under the trademark "Rokide."

In the embodiment of FIGURE 7, the insert 24c is a simple annular member of solid lubricant. The insert may be formed, for example, of porous bronze the internal surface of which is acid etched to open the pores. Alternatively, the insert may be formed of polytetrafluoroethylene material such, for example, as that sold under the trademark "Rulon." Again, the insert may be formed of a composite material such, for example, as copper, tungsten diselenide and polytetrafluoroethylene, e.g. that sold under the trademark "Composite" by Westinghouse. The insert may also be formed of Stellite or of the polytetrafluoroethylene material sold under the trademark "Fluorosint."

It will be appreciated that many alternative materials may be employed with the inserts of the present invention provided the materials act as a solid lubricant for the bearing. Thus, graphite, metals, metal salts, ceramics, any suitable synthetic resin materials, unreinforced or reinforced with fibres, molybdenum disulphide, or any other suitable solid lubricant may be employed.

In the embodiment of FIGURES 8 and 9, a bearing 40 has an outer race 41, a split inner race 42, and balls 43 in rolling contact with the races 41, 42. The balls 43 are disposed in pockets 44 of a cage 45, each ball 43 being surrounded by an annular insert 46 of solid lubricant disposed in the respective pocket 44.

The opposite ends of the cage 45 are respectively received within annular members 50, 51 which are respectively provided with flanges 52, 53 which engage the inserts 46 to assist in locating the latter.

The annular member 51 has a groove 54 formed therein which, together with an adjacent groove 55 in the face of the cage 45, forms an oil reservoir 56. The cage 45 has three small passageways 57 through which oil from the reservoir 56 may reach the outer peripheral surface 60 of the insert 46 to replenish the latter.

The use of solid lubricants in a roller bearing in the form of inserts in the cage pockets greatly improves the lubricating capabilities of the solid lubricant and enables one to use solid lubricant on relatively large diameter bearings such, for example, as the main bearings of a gas turbine engine. The bearing of the present invention is particularly useful as the main bearing of a gas turbine engine and particularly of a direct lift engine since the use of a solid lubricant obviates, or at least reduces, the need for liquid lubricant reservoirs, pumps, supply ducting and exhaust ducting, filters and seals, etc., all of which increase the weight of the engine appreciably. By employing a solid lubricant which would not require any of these accessories, a much lighter engine is provided, the thrust to weight ratio of which is increased.

We claim:

1. A bearing comprising radially spaced races, rolling elements disposed between and in rolling contact with said races, an integrally formed cage having pockets within which the rolling elements are disposed and in each pocket an insert comprising a member having lubricating properties which surrounds the respective rolling element, each pocket having a radially inwardly facing surface, each respective insert having a radially outwardly facing surface which abuts the said inwardly facing surface.

2. A bearing as claimed in claim 1 in which the radially outer edge of each insert is chamfered to form the said surface and abuts a chamfered flange on the cage.

3. A bearing as claimed in claim 1 in which the radially outwardly facing surface of each insert abuts a corresponding radially inwardly facing flange in each pocket.

4. A bearing as claimed in claim 1 in which the rolling elements are balls and the inserts are annular.

5. A bearing as claimed in claim 1 in which the inserts extend radially inwardly of said cage, the radially inner face of each insert being curved to conform to the shape of the radially outer face of said inner race.

6. A bearing as claimed in claim 1 in which the bearing is provided with an oil reservoir and there are conduit means for conveying oil from the reservoir to the insert to replenish the latter.

7. A bearing as claimed in claim 6 in which the conduit means supplies the oil to the outer peripheral surface of the insert.

8. A bearing as claimed in claim 1 in which each insert comprises a metal sleeve which is at least partially lined with the member having lubricating properties.

9. A bearing as claimed in claim 8 in which the sleeve is lined with a honeycomb liner the cells of which each contain a member having lubricating properties.

10. A bearing as claimed in claim 1 in which the member having lubricating properties comprises a porous member impregnated with a liquid lubricant.

11. A bearing as claimed in claim 6 comprising a pair of annular members which respectively receive opposite ends of the cage, one of the members having a cavity which constitutes the reservoir, the cage having conduits therein to feed oil from the reservoir to the respective inserts.

12. A bearing as claimed in claim 6 wherein the annular members are provided with axially extending flanges which abut the radially inner ends of the inserts to retain them in their respective pockets.

References Cited

UNITED STATES PATENTS 2,029,445 2/1936 Schubert _____ 308—201
3,239,288 3/1966 Cambell et al. _____ 308—187

MARTIN P. SCHWADRON, *Primary Examiner.*

FRANK SUSKO, *Examiner.*